(12) United States Patent
Richardson

(10) Patent No.: US 7,839,782 B2
(45) Date of Patent: Nov. 23, 2010

(54) METHOD AND SYSTEM OF MANAGING TRAFFIC IN A FIRST SET OF NODES OF A COMPUTER NETWORK

(75) Inventor: David E. Richardson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1981 days.

(21) Appl. No.: 10/814,224

(22) Filed: Apr. 1, 2004

(65) Prior Publication Data

US 2005/0220018 A1   Oct. 6, 2005

(51) Int. Cl.
*H04J 1/16* (2006.01)
(52) U.S. Cl. .................................... 370/231
(58) Field of Classification Search ............ None
See application file for complete search history.

(56) References Cited

U.S. PATENT DOCUMENTS

| | | | | |
|---|---|---|---|---|
| 5,933,416 A | * | 8/1999 | Schenkel et al. | 370/254 |
| 6,085,243 A | * | 7/2000 | Fletcher et al. | 709/224 |
| 6,421,719 B1 | * | 7/2002 | Lewis et al. | 709/224 |
| 6,470,025 B1 | * | 10/2002 | Wilson et al. | 370/462 |
| 6,618,355 B1 | * | 9/2003 | Gulliford et al. | 370/230 |
| 7,042,880 B1 | * | 5/2006 | Voit et al. | 370/395.1 |
| 7,359,676 B2 | * | 4/2008 | Hrastar | 455/67.11 |

\* cited by examiner

*Primary Examiner*—Raj K Jain

(57) ABSTRACT

A method and system are disclosed for determining the source or sources of a relatively high amount of traffic into a first set of nodes from another set of nodes. In one example, the top talker sources among a first set of nodes are found. Any top talker sources, which are from another set of nodes are determined, and an alert is produced which indicates the top talker sources to the network manager.

22 Claims, 2 Drawing Sheets

METHOD AND SYSTEM OF MANAGING TRAFFIC IN A FIRST SET OF NODES OF A COMPUTER NETWORK

BACKGROUND

A Virtual Local Area Network (VLAN) is a grouped set of network elements, or nodes. Messages can, for example, broadcast to all of the nodes within the VLAN using a VLAN address. Messages can also be transmitted between VLANS. Transmitting data between multiple VLANS can involve using a router at the edge of each VLAN. For example, to transmit a message to a computer node outside a given VLAN, the message is sent to a router on an edge of the given VLAN, wherein the router uses, for example, a layer 3 networking protocol. If a large amount of data is sent between the VLANs, a large amount of traffic may be sent through the router, which can slow the network traffic.

SUMMARY

A method of managing traffic in a first set of nodes of a computer network is disclosed. In accordance with exemplary embodiments, the network includes a first set of nodes and a second set of nodes. The method includes determining a source associated with an amount of network traffic over the first set of nodes which exceeds a threshold, the source being outside a group of network elements assigned to the first set of nodes. An indication of the source can be automatically displayed in response to determining the source.

Exemplary embodiments are also directed to a management computer for managing traffic in a first set of nodes of a computer network having first and second sets of nodes. The management computer includes a display and a processor. The processor is configured to determine a source associated with an amount of network traffic over the first set of nodes that exceeds a threshold, the source being outside a group of network elements assigned to the first set of nodes. The processor is configured to automatically send to the display an indication of the source in response to determining the source.

Exemplary embodiments are also directed to a system for managing traffic in a first set of nodes of a computer network having first and second sets of nodes. The system comprises a first set of nodes and a management computer. The management computer is configured to determine a source associated with an amount of network traffic over the first set of nodes that exceeds a threshold, the source being outside a group of network elements assigned to the first set of nodes. The management computer is configured to automatically display an indication of the source in response to determining the source.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF EXEMPLARY EMBODIMENTS

Figure 1:
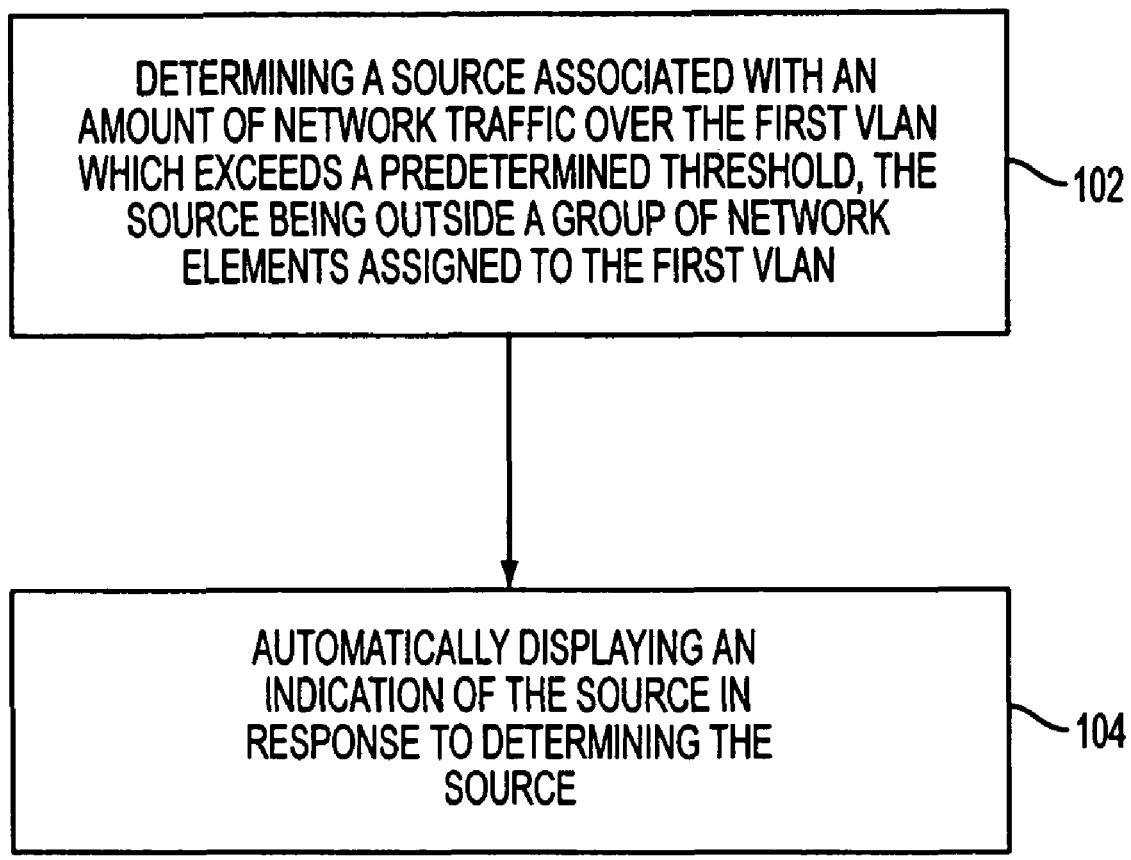
FIG. 1 is a flow chart illustrating an exemplary method for managing a computer network having first and second sets of nodes.

FIG. 1 is a flow chart illustrating an exemplary method for managing traffic in a first set of nodes of a computer network having first and second sets of nodes. The first set of nodes can be any designated group of one or more nodes and can, for example, be designated a first VLAN. The second set of nodes can be any designated group of one or more nodes and can, for example, be designated as a second VLAN. The method can be implemented on a computer, wherein a computer readable medium can contain a program for performing the method.

In block 102, a source associated with an amount of traffic over a first VLAN which exceeds a threshold is determined. This source can, for example, be outside a group of network elements assigned to the first VLAN.

The amount of network traffic over the first VLAN can be determined by examining the traffic of a switching element or probe associated with the first VLAN, or by any other suitable method. The threshold can be the level of traffic sufficient for the source to be considered what will be referenced to herein as a "top talker source". This threshold can be a percentage of the total traffic over the VLAN, a fixed level of data traffic, or any other desired threshold.

In an exemplary embodiment, a top talker source (or top talker sources) which satisfies a specified characteristic is determined and identified as the source (or sources) of traffic which exceeds a given threshold. Each top talker source can be examined to determine any top talker source which does not belong to the first VLAN.

Traffic data can, for example, be obtained and monitored in the first VLAN using a network management protocol. This traffic data can be used to identify the source associated with traffic over the first and/or second VLAN. In one embodiment, the traffic data is obtained using a remote monitoring (RMON) protocol. The traffic data can be obtained from a switching element in the first VLAN, from a probe or in any other suitable manner. In an exemplary embodiment, the top talker sources of traffic on the first VLAN can be determined using an RMON protocol, and the following exemplary pseudocode

```
For each VLAN
    Determine top talker sources over tested VLAN
    For each top talker source
        Determine VLAN of top talker source
        If VLAN of the top talker source is not the tested
        VLAN
            Produce alert
        Else
```

In block 104, an indication of each top talker source is automatically displayed in response to determining the source. A management computer can display an identifier of each such source, and can indicate the level of network traffic associated with each source.

In an exemplary embodiment, the identifier can be an indication of a user name associated with the source. For example, if the source is associated with the user name, "Frank", the display can indicate that "Frank" (being in VLAN 2) is the source of excessive traffic within VLAN 1. An alert concerning the source can also be produced and displayed. The alert can include information concerning the amount of traffic from the source over its own VLAN; this information can be useful in a network manager's decision to reassign the source to a different VLAN. The alert can include an indication of the top talker sources from other VLANs and an indication of the level of traffic over the VLANs due to those sources. The alert can also include the identifier (e.g., user name) associated with the top talker source or sources.

The determination of a source assigned to VLAN 2 which causes excessive traffic in VLAN 1 can be used to initiate a reassignment of the source to the VLAN 1. A network manager can manually or remotely reassign a top talker source to a different VLAN 1. In the previous example, by reassigning the source to the VLAN 1, the amount of cross-VLAN traffic in the computer network is reduced and the efficiency of the network can be improved. In an exemplary embodiment, upon determination of the source, the system can automatically reassign the source to the first VLAN and produce an indication to the network manager of the reassignment.

In an exemplary embodiment, the top talker sources are determined for each VLAN within the computer network. For each VLAN, a switching element, or probe associated with an RMON agent can be queried to determine the top talker sources. More than one location may need to be checked when determining the top talker sources of each VLAN. For each source, a VLAN ID is determined. For example, a stored association between a source address and a VLAN ID can be examined to determine the VLAN ID. If the VLAN ID of the top talker source is not the same as the VLAN ID of the tested VLAN, an alert can be produced to indicate that the source is from another VLAN.

The following pseudocode includes a task which can be executed to ensure that network utilization of a top talker source is above a minimum value before producing an alert:

```
For each VLAN
    Determine top talker sources over tested VLAN
    For each top talker source
        Determine percentage tested VLAN network utilization
        If percentage network utilization > minimum value
            Determine VLAN of top talker source
            If VLAN of top talker source is not tested
              VLAN
                Produce alert
        Else
    Else
```

Figure 2:
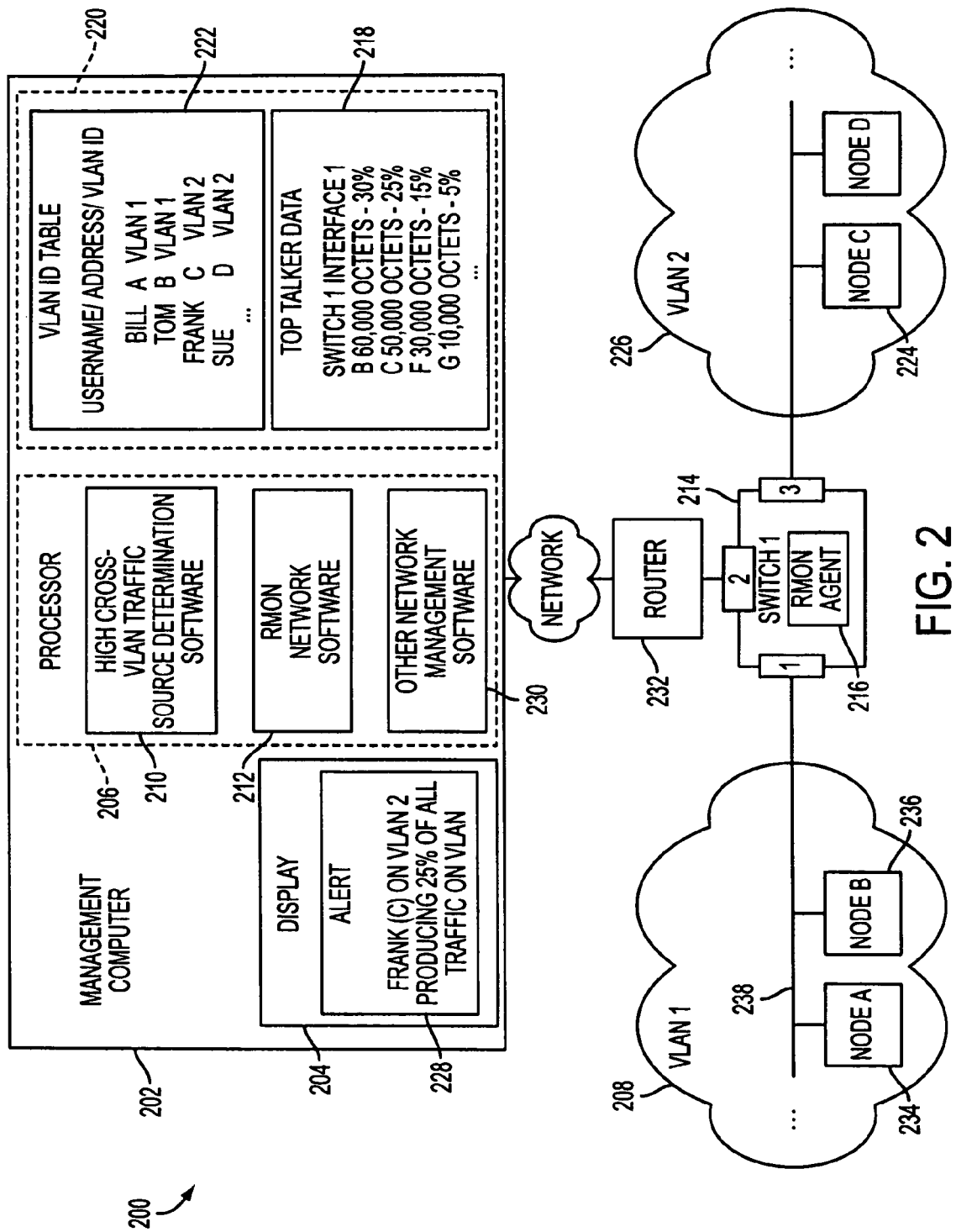
FIG. 2 is a diagram that illustrates an exemplary management computer and a system for managing a computer network.

FIG. 2 is a diagram illustrating an exemplary management computer and system. Traffic within a first VLAN 208, such as the traffic between nodes 234 and 236, can be sent over network 238 without going through an edge router. However, in the FIG. 2 example, traffic from node 224 of a second VLAN 226 cannot connect to node 234 of VLAN 208 directly through switch 214, but rather is sent via the router 232. The router can use, for example, a layer 3 protocol to route the traffic to the node 234 of the first VLAN 208. Heavy use of the router 232 can slow the overall network.

An exemplary management computer 202 is provided which includes a display 204 and a processor 206. The processor is configured to determine a source associated with the amount of network traffic over the first VLAN 208 that exceeds a threshold. This source can be outside of a group of network elements assigned to the first VLAN. The processor is configured to automatically send to the display an indication of the source in response to determining the source.

In the FIG. 2 example, the processor 206 can include high cross VLAN traffic source determining software 210 that identifies any sources of traffic which are associated with a given threshold of traffic on the first VLAN. The software can determine, for example, that a relatively high amount of traffic on the first VLAN 208 is due to a source from the second VLAN 226.

The software 210 interfaces with RMON network software 212. The RMON network software 212 can produce a list of the top talker sources on a switching element or probe at the first VLAN 208. For example, the RMON agent 216 at the switch 214 can monitor an interface "1" of switch 214. The RMON agent 216 can maintain a Management Information Block (MIB) to track the source ID of the top talker sources which communicate across this interface. Top talker data 218 obtained from the RMON agent 216 at the switch 214 can be stored in a memory 220 of the management computer 202. For example, the source ID and data packet size of information associated with each data packet that passes through interface 1 can be examined and used to increment a value in the memory 220 which keeps track of the amount of data sent through this interface by each source. In this example, the top talker data 218 indicates the top talker sources for the interface "1" of the switch 214. This exemplary top talker data can also be processed using the RMON network software 212 to identify the amount of traffic, and the percentage of overall traffic across the interface 1 attributable to each identified top talker source.

The VLAN source determining software 210 can check the top talker data 218 to determine which of the top talker sources are not from the first VLAN 208. In FIG. 2, an exemplary VLAN ID table 222 stored in the memory 220 is consulted. The VLAN ID table correlates the addresses of each source in the network to a particular VLAN ID. Optionally, a user name and/or any other desired information can be associated with each source.

In an exemplary embodiment, the VLAN ID table 222 can be produced by any suitable network management software 230 used for discovering nodes of a network. An example of network management software is the Network Node Manager (NNM) of Hewlett-Packard's OpenView product. The network management software 230 can include software for discovering and displaying the different nodes within the computer network 200, as well as indicating which VLANs the various nodes are associated with, and the user names associated with each node address.

In an exemplary operation, where the node 224 (node C) in the second VLAN 226 is a top talker source on the first VLAN 208, an alert can be produced for the display 204 by the software 210. The threshold used to identify node 224 as a top talker source can be any desired threshold. For example, it may be desired to have the total percentage of traffic due to sources which are external to the VLAN be maintained below a certain threshold level. The network manager can establish that the traffic within the first VLAN be maintained at 80% of the total traffic handled by that VLAN, with traffic from outside of the VLAN being limited to 20% or less. The alert 228 produced at the display 204 can indicate when the level of traffic handled by the first VLAN 208 from sources outside the VLAN 208 is approaching and/or is above this 20% value. The alert 228 can include an indication of the user name, the address, and the level of traffic originated by each external source into the VLAN 208. All such external sources can be identified. Alternately, only those sources which are responsible for sourcing an amount of traffic above a given threshold over a predetermined amount of time or specified interval, can be identified.

The presently disclosed embodiments are considered in all respects to be illustrative and not restrictive. The scope is indicated by the appended claims, rather than the foregoing description, and all changes that come within the meaning and range of equivalence thereof are intended to be embraced.

What is claimed is:

1. A method of managing traffic in a first set of nodes of a computer network having first set of nodes and a second set of nodes comprising:
   determining a source associated with an amount of network traffic over the first set of nodes comprising a first VLAN which exceeds a threshold, the source being outside a group of network elements assigned to the first set of nodes;
   automatically displaying an indication of the source in response to determining the source, wherein determining the source includes:
      determining top talker sources over said first VLAN and a second VLAN;
      determining VLAN identifiers for the top talker sources; and
      displaying the indication if the VLAN identifier of at least one of the top talker sources is not the same as the VLAN identifier of said first VLAN being tested; and
   reassigning the source to said first VLAN in response to determining the source comprises a node of a second VLAN.

2. The method of claim 1, wherein the indication is a user name associated with the source.

3. The method of claim 1, wherein the source is automatically reassigned.

4. The method of claim 1, wherein traffic data is obtained from said first VLAN using a network management protocol.

5. The method of claim 4, wherein the traffic data is obtained using a remote monitoring protocol.

6. The method of claim 1, wherein the determination of the source includes determining the top sources of traffic on said first VLAN.

7. A computer for managing traffic in a first set of nodes of a computer network having a first set of nodes and a second set of nodes, the computer comprising:
   a display; and
   a processor configured to:
   determine a source associated with an amount of network traffic over a first set of nodes which exceeds a threshold,
   determine whether the source is outside a group of network elements assigned to the first set of nodes by checking top talker data to determine which of a plurality of top talker sources are not from the first set of nodes, the processor configured to automatically send to the display an indication of the source in response to determining the source, wherein the first set of nodes is a first VLAN and the second set of nodes is a second VLAN, and wherein the processor is configured to reassign the source to said first VLAN in response to determining the source comprises a node of said second source.

8. The computer of claim 7, wherein the indication is a user name associated with the source.

9. The computer of claim 7, wherein the processor is configured to obtain traffic data from the first VLAN using a network management protocol.

10. The computer of claim 9, wherein the processor is configured to obtain traffic data using a remote monitoring protocol.

11. The computer of claim 7, wherein the processor is configured to identify any sources of traffic which are associated with a given threshold of traffic on the first VLAN.

12. A system for managing traffic in a first set of nodes of a computer network comprising:
   a first set of nodes; and
   a computer coupled with the first set of nodes and configured to determine a source associated with an amount of network traffic over the first set of nodes which exceeds a threshold, and to further determine whether the source is outside a group of network elements assigned to the first set of nodes by accessing source identifiers of top talker sources from management data, the computer configured to automatically display an indication of the source in response to determining the source, wherein the first set of nodes is a first VLAN and a second set of nodes is a second VLAN; and wherein said computer is configured to reassign the source to said first VLAN in response to determining said source comprises a node of said second VLAN.

13. The system of claim 12, wherein the indication is a user name associated with the source.

14. The system of claim 12, wherein the computer is configured to obtain traffic data from the first VLAN using a network management protocol.

15. The system of claim 14, wherein the computer is configured to obtain traffic data from the first VLAN using a remote monitoring protocol.

16. The system of claim 12, wherein the computer is configured to identify any sources of traffic which are associated with a given threshold of traffic on the first VLAN.

17. A computer-readable medium containing a program executable by a processor for managing traffic in a first set of nodes of a computer network having a first set of nodes and a second set of nodes, the program comprising:
   determining a source associated with an amount of network traffic over the first set of nodes which exceeds a threshold,
   determining whether the source is outside a group of network elements assigned to the first set of nodes based on whether source identifiers for top talker sources are the same as a source identifier for the first set of nodes;
   automatically displaying an indication of the source in response to determining the source, wherein the first set of nodes is a first VLAN and the second set of nodes is a second VLAN; and
   reassigning the source to said first VLAN in response to determining the source comprises a node of said second VLAN.

18. The computer-readable medium containing a program of claim 17, wherein the indication is a user name associated with the source.

19. The computer-readable medium containing a program of claim 17, wherein the source is automatically reassigned.

20. The computer-readable medium containing a program of claim 17, wherein traffic data is obtained from the first VLAN using a network management protocol.

21. The computer-readable medium containing a program of claim 20, wherein the traffic data is obtained using a remote monitoring protocol.

22. The computer-readable medium containing a program of claim 17, wherein the determination of the source includes identifying any sources of traffic which are associated with a given threshold of traffic on the first VLAN.

* * * * *